United States Patent [19]

Kaeppeli

[11] 4,251,440
[45] Feb. 17, 1981

[54] MONOAZO COMPOUNDS HAVING A THIAZOLIUM OR SUBSTITUTED THIAZOLIUM DIAZO COMPONENT RADICAL AND A 1,4-PHENYLENE COUPLING COMPONENT RADICAL HAVING A $C_{1-4}$ALKYL GROUP IN EACH ORTHO POSITION

[75] Inventor: Viktor Kaeppeli, Allschwil, Switzerland

[73] Assignee: Sandoz Ltd., Basel, Switzerland

[21] Appl. No.: 572,849

[22] Filed: Apr. 29, 1975

[30] Foreign Application Priority Data

May 4, 1974 [CH] Switzerland .......................... 6051/74

[51] Int. Cl.³ ...................... C07C 107/04; C09B 44/10; C09B 44/20
[52] U.S. Cl. ................................. 260/146 R; 260/156; 260/157; 260/158; 260/162; 260/208
[58] Field of Search ............................ 260/158, 146 R

[56] References Cited

U.S. PATENT DOCUMENTS

| | | | |
|---|---|---|---|
| 2,864,812 | 12/1958 | Bossard et al. | 260/158 X |
| 2,889,315 | 6/1959 | Bossard et al. | 260/158 X |
| 3,084,153 | 4/1963 | Fishwick et al. | 260/158 |

FOREIGN PATENT DOCUMENTS 551341 2/1943 United Kingdom ..................... 260/158

Primary Examiner—Charles F. Warren
Attorney, Agent, or Firm—Gerald D. Sharkin; Richard E. Vila; Melvyn M. Kassenoff

[57] ABSTRACT

Monoazo dyes of the formula

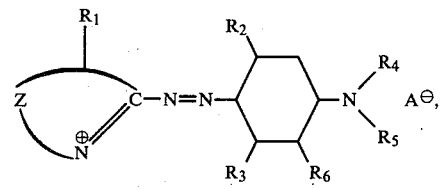

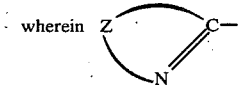

wherein Z is optionally substituted thiazolyl, benzothiazolyl, 1,2,4-triazolyl, indazolyl, imidazolyl or pyridyl or naphtho-[2,1-d]-thiazolyl, $R_1$ is optionally substituted alkyl, phenylalkyl, cycloalkyl or alkenyl, each of $R_2$ and $R_3$ is independently optionally substituted alkyl, $R_4$ is hydrogen or optionally substituted alkyl, phenylalkyl, cycloalkyl or phenyl, $R_5$ is hydrogen or optionally substituted alkyl, or $R_4$ and $R_5$ taken together and with the nitrogen atom to which they are joined are optionally substituted saturated heterocyclyl, $R_6$ is hydrogen or methyl, and $A^\ominus$ is an anion, with the proviso that the molecule is free of sulfo groups, are useful for the dyeing and printing of basic dyeable substrates, e.g., materials comprising or consisting of homo- or mixed-polymers of acrylonitrile or asymmetrical dicyanoethylene or synthetic polyamides or polyesters modified to contain acid groups, leather and paper.

7 Claims, No Drawings

MONOAZO COMPOUNDS HAVING A THIAZOLIUM OR SUBSTITUTED THIAZOLIUM DIAZO COMPONENT RADICAL AND A 1,4-PHENYLENE COUPLING COMPONENT RADICAL HAVING A $C_{1-4}$ALKYL GROUP IN EACH ORTHO POSITION

The invention relates to basic azo compounds.

The invention provides basic monoazo dyestuffs, free from sulphonic acid groups and containing, as the radical derived from the diazo component, a thiazole, benzothiazole, naphtho-[2,1-d]-thiazole, 1,2,4-triazole, indazole, imidazole or pyridyl radical, bound to the azo linkage through a carbon atom adjacent a ring nitrogen atom, and being in quaternised form, and, as the radical derived from the coupling component, an aminophenyl radical, the amino group being in para position to the azo linkage and the phenyl group bearing, in both positions ortho to the azo linkage, an alkyl group.

The heterocyclic radicals, with the exception of the naphtho-[2,1-d]-thiazole radical, are optionally substituted, as are the alkyl groups on the coupling component ortho to the azo linkage. The phenyl group in the coupling component is optionally further substituted and the para amino group may be primary, secondary, tertiary or saturated cyclic and, again, optionally substituted. A wide variety of substituents are possible, but are chosen so as not deleteriously to affect the dyeing properties of the compounds, suitable examples being hereinafter given.

Representative of the dyes provided by the invention may be given the compounds of formula I,

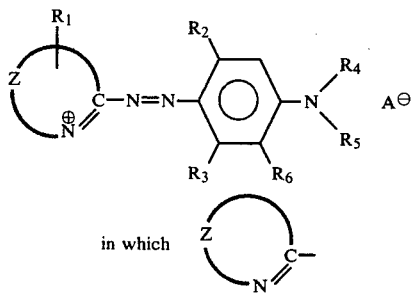

in which 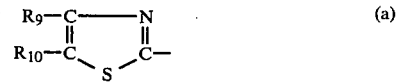

is an optionally substituted thiazole, benzothiazole, 1,2,4-triazole, indazole, imidazole or pyridyl radical or an unsubstituted naphtho-[2,1-d]-thiazole radical, $R_1$ is an optionally substituted alkyl, phenylalkyl, cycloalkyl or alkenyl radical, $R_2$ and $R_3$, independently, are optionally substituted alkyl, either $R_4$ is hydrogen or optionally substituted alkyl, phenylalkyl, cycloalkyl or phenyl, and $R_5$ is hydrogen or optionally substituted alkyl, or $R_4$ and $R_5$, together with the nitrogen to which they are attached, form an optionally substituted saturated heterocycle, $R_6$ is hydrogen or methyl, and $A^\ominus$ is an anion, preferably a non-chromophoric anion.

The preferred Z containing heterocycles are the thiazole, benzothiazole, naphtho-[2,1-d]-thiazole and 1,2,4-triazole radicals, particularly the benzothiazole radicals.

Of the thiazole radicals, those which are unsubstituted or substituted by one or two, preferably one, phenyls, or by one or two $C_{1-4}$alkyls are preferred, particularly the radicals which, in unquaternised form, are of formula (a),

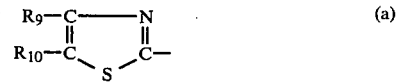

in which either $R_9$ and $R_{10}$, independently, signify hydrogen or $C_{1-4}$alkyl, or one of $R_9$ and $R_{10}$ signifies phenyl, the other hydrogen.

The radicals of formula (a) in which both $R_9$ and $R_{10}$ are hydrogen are particularly preferred.

Of the benzothiazole radicals, those which are unsubstituted or monosubstituted in the benzene ring by $C_{1-4}$alkyl, $C_{1-4}$alkoxy, halogen, phenoxy, acetylamino, benzoylamino, $C_{1-4}$alkoxycarbonyl or $C_{1-4}$alkylsulphonyl are preferred, any such substituent preferably being in the 6-position of the benzothiazole radical. Particular radicals are those which, in unquaternised form, are of formula (b),

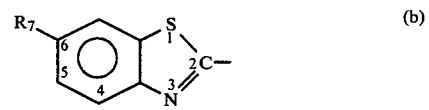

in which $R_7$ is hydrogen, $C_{1-4}$alkyl, $C_{1-4}$alkoxy, phenoxy or acetylamino, preferably hydrogen, methyl, methoxy or ethoxy.

Of the triazole radicals, those which are unsubstituted or substituted by up to two substituents selected from $C_{1-4}$alkyl, phenyl and benzyl are preferred, particularly the radicals which, in unquaternised form, are of formula (c),

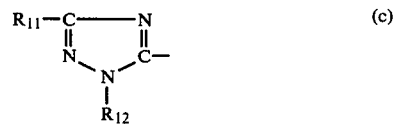

in which $R_{11}$ is hydrogen, $C_{1-4}$alkyl, phenyl or benzyl, and $R_{12}$ is $C_{1-4}$alkyl, phenyl or benzyl.

In formula (c) $R_{11}$ is preferably hydrogen, $C_{1-2}$alkyl or phenyl, and $R_{12}$ is preferably $C_{1-2}$alkyl.

Where $R_1$ is optionally substituted alkyl, such alkyl is preferably straight chain and of 1 to 6 carbon atoms, unsubstituted or substituted by a halogen atom and/or by a hydroxy or cyano, or by a $C_{1-4}$alkoxy or carboxamido (carbamoyl) group. When substituted, particularly by hydroxy, cyano or carboxamido, such alkyl preferably contains at least two carbon atoms.

Where $R_1$ is optionally substituted phenylalkyl, any substituent is in the phenyl nucleus and the alkyl moiety is preferably of 1 to 6 carbon atoms. Any phenylalkyl as $R_1$ is preferably unsubstituted.

Where $R_1$ is optionally substituted cycloalkyl, such preferably contains 5 or 6, more preferably 6, ring carbon atoms and, most preferably, is unsubstituted.

When $R_1$ is optionally substituted alkenyl, such is preferably of 2 to 4 carbon atoms and, more preferably, unsubstituted. The most preferred alkenyl as $R_1$ is allyl.

The preferred significances of the quaternising group ($R_1$) are straight chain $C_{1-6}$alkyl, unsubstituted or substituted by a halogen and/or by a hydroxy or cyano, or by a $C_{1-4}$alkoxy or carboxamido; and allyl; more preferably unsubstituted $C_{1-4}$alkyl, 2-hydroxyethyl, 2-hydroxypropyl and 2-carboxamidoethyl; most preferably methyl and ethyl.

Any optionally substituted alkyl as $R_2$ and $R_3$ is preferably of 1 to 4 carbon atoms and, where substituted, such alkyl radicals are preferably monosubstituted by halogen. Such alkyls are, however, preferably unsubstituted, more preferably of 1 to 3 carbon atoms and most preferably of 1 or 2 carbon atoms.

Any optionally substituted alkyl as $R_4$ is preferably of 1 to 4 carbon atoms, unsubstituted or substituted by one or two, preferably one, halogens or by a hydroxy, cyano, phenyl, benzoyloxy, $C_{1-4}$alkoxycarbonyl, phenylcarbamoyl, phenoxy, di-($C_{1-4}$)alkylcarbamoyl, (carbamoyl), phenylcarbamoyloxy, di-($C_{1-4}$)alkylcarbamoyloxy or $C_{1-4}$alkoxy. Any substituted alkyl, except where substituted by phenyl, is preferably of at least two carbon atoms.

Where $R_4$ is optionally substituted phenylalkyl, any substituent is on the phenyl group, and the alkyl moiety is preferably of 1 to 4 carbon atoms. Any phenylalkyl as $R_4$ is preferably unsubstituted.

Where $R_4$ is optionally substituted phenyl, such is preferably unsubstituted or monosubstituted, e.g. by a $C_{1-4}$alkoxy group, in para position. Where $R_4$ is optionally substituted cycloalkyl, such is preferably of 5 or 6, more preferably 6, ring carbon atoms. Any cycloalkyl as $R_4$ is preferably unsubstituted.

The preferred significances of $R_4$ are hydrogen, the preferred optionally substituted alkyls as given above, phenyl, p-$C_{1-4}$alkoxyphenyl and cyclohexyl, more preferably unsubstituted $C_{1-4}$alkyl, 2-hydroxy-, 2-chloro-, 2-phenoxy-, 2-cyano- and 2-carboxamido-ethyl, phenyl and benzyl, more preferably unsubstituted $C_{1-4}$alkyl, phenyl and benzyl.

Any optionally substituted alkyl as $R_5$ is preferably of 1 to 4 carbon atoms, unsubstituted or substituted by one or two, preferably one, halogens or by a hydroxy, cyano, phenyl, benzoyloxy, $C_{1-4}$alkoxycarbonyl, di-$C_{1-4}$alkylcarbamoyl, carboxamido, phenoxy, phenylcarbamoyl or $C_{1-4}$alkoxy; any substituted alkyl, except where substituted by phenyl, being preferably of at least two carbon atoms.

The preferred significances of $R_5$ are hydrogen and the preferred optionally substituted alkyls as given above, more preferably unsubstituted $C_{1-4}$alkyl and 2-hydroxy-, 2-phenoxy-, 2-cyano- and 2-carboxamido-ethyl, most preferably unsubstituted $C_{1-4}$alkyl.

Where $R_4$ and $R_5$, together with the nitrogen atom, signify a heterocycle, such is preferably 5 or 6 membered, more preferably the morpholine radical. $R_6$ is preferably hydrogen or, when $R_4$ and $R_5$ both signify hydrogen, preferably methyl.

The preferred compounds of formula I are the compounds of formula Ia

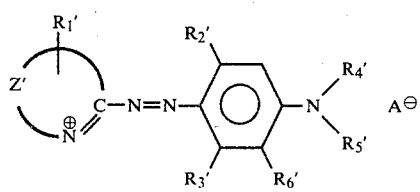

Ia in which 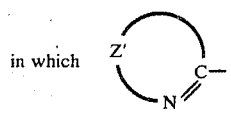

signifies (w) a thiazole radical, unsubstituted or substituted by one or two phenyls, or by one or two $C_{1-4}$alkyls, preferably a radical of formula (a), above, (x) a benzothiazole radical, unsubstituted or monosubstituted on the benzene nucleus by a $C_{1-4}$alkyl, $C_{1-4}$alkoxy, halogen, phenoxy, acetylamino, benzoylamino, $C_{1-4}$alkoxycarbonyl or $C_{1-4}$alkylsulphonyl, preferably a radical of formula (b), above, (y) an unsubstituted naphtho-[2,1-d]-thiazole radical, or (z) a 1,2,4-triazole radical, unsubstituted or substituted by one or two substituents selected from $C_{1-4}$alkyl, phenyl and benzyl, preferably a radical of formula (c), above, the quaternizing group $R_1'$ is $C_{1-6}$ straight chain alkyl, unsubstituted or substituted by a halogen and/or by a hydroxy or cyano, or by a $C_{1-4}$alkoxy or carboxamido; or allyl; preferably unsubstituted $C_{1-4}$alkyl, 2-hydroxyethyl, 2-hydroxypropyl or 2-carboxamidoethyl; more preferably methyl or ethyl, $R_2'$ and $R_3'$, independently, are unsubstituted $C_{1-4}$alkyl, more preferably $C_{1-3}$, and most preferably $C_{1-2}$, alkyl, either $R_4'$ is hydrogen; $C_{1-4}$alkyl, unsubstituted or substituted by one or two halogens or by a hydroxy, cyano, phenyl, benzoyloxy, $C_{1-4}$alkoxycarbonyl, phenylcarbamoyl, phenoxy, di-$C_{1-4}$alkylcarbamoyl, carboxamido, phenylcarbamoyloxy, di-$C_{1-4}$alkylcarbamoyloxy or $C_{1-4}$alkoxy; phenyl; p-$C_{1-4}$alkoxyphenyl; or cyclohexyl; preferably unsubstituted $C_{1-4}$alkyl, 2-hydroxy-, 2-chloro-, 2-phenoxy-, 2-cyano or 2-carboxamido-ethyl, phenyl or benzyl; more preferably $C_{1-4}$alkyl, phenyl or benzyl, and $R_5'$ is hydrogen, $C_{1-4}$alkyl, unsubstituted or substituted by 1 or 2 halogens, or by a hydroxy, cyano, phenyl, benzoyloxy, $C_{1-4}$alkoxycarbonyl, di-$C_{1-4}$alkylcarbamoyl, carboxamido, phenoxy, phenylcarbamoyl or $C_{1-4}$alkoxy, preferably unsubstituted $C_{1-4}$alkyl, 2-hydroxy-, 2-phenoxy-, 2-cyano- or 2-carboxamido-ethyl, most preferably unsubstituted $C_{1-4}$alkyl, or $R_4'$ and $R_5'$, together with the nitrogen atom, form a saturated 5- or 6-membered heterocyclic ring, preferably a morpholino ring, and $R_6'$ is hydrogen or, when $R_4'$ and $R_5'$ both signify hydrogen, $R_6'$ is methyl, and $A^\ominus$ is as defined above.

Among the preferred compounds of formula Ia are those where

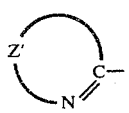

is a radical of formula (a), with those of this preferred group wherein each of $R_1'$, $R_2'$ and $R_3'$ is independently methyl or ethyl, $R_4'$ is $C_{1-4}$alkyl, phenyl or benzyl, $R_5'$ is $C_{1-4}$alkyl, and $R_6'$, $R_9$ and $R_{10}$ are hydrogen being most preferred.

By halogen, as used herein, is to be understood fluorine, chlorine, bromine and iodine, chlorine being preferred.

The anion $A^\ominus$ may be an organic or inorganic anion, conveniently one commonly used in basic dyestuff chemistry, e.g. halide, such as chloride, bromide, iodide, sulphate, bisulphate, methylsulphate, aminosulphate, perchlorate, carbonate, bicarbonate, phosphate, phosphorus molybdate, phosphorus tungstate, phosphorus tungsten molybdate, benzenesulphonate, napthalenesulfonate, 2-chlorobenzenesulphonate, oxalate, maleinate, acetate, propionate, lactate, succinate, chloroacetate, tartrate, malate, methanesulphonate and benzoate, as well as complex anions such as those of zinc chloride double salts, such as $ZnCl_3^\ominus$.

The invention also provides a process for the production of the compounds above defined, which process comprises quaternizing a monoazo compound, free from sulphonic acid groups and containing, as the radical derived from the diazo component, a thiazole, benzothiazole, naphtho-[2,1-d]thiazole, 1,2,4-triazole, indazole, imidazole or pyridyl radical, bound to the azo grouping through a carbon atom adjacent a ring nitrogen atom and, as the radical derived from the coupling component, an aminophenyl radical, the amino group being in para-position to the azo linkage and the phenyl group bearing, in both positions ortho to the azo linkage, an alkyl group.

In particular, the invention provides a process for the production of compounds of formula I, stated above, comprising quaternising a compound of formula II,

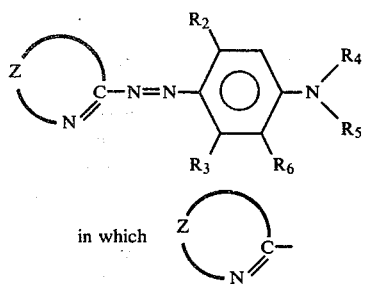

in which and $R_1$ to $R_6$ are as defined above, with an $R_1$ releasing quaternising agent.

The quaternisation is conveniently carried out employing a compound $R_1$-A in which $R_1$ is as defined above and A is a radical convertible into the anion $A^\ominus$ or, alternatively in appropriate cases, by an addition reaction with an $R_1$ yielding epoxide or vinyl compound, in the presence of an acid H-A. As examples of the quaternising agents of formula $R_1$-A may be given the alkyl halides, e.g. methyl or ethyl chloride, bromide or iodide, alkyl sulphates, such as dimethylsulphate, and benzyl chloride. As examples of $R_1$ yielding epoxides and vinyl compounds may be given acrylic acid amides, e.g. $CH_2CH-CO-NH_2$, ethylene oxide, propylene oxide and epichlorohydrin. The quaternisation may be carried out in conventional manner, e.g. in an inert organic solvent, in aqueous suspension, or in the presence of excess quaternising agent, if necessary at elevated temperature and optionally with buffering.

The anion obtained directly by the quaternisation may, as desired, be replaced by another, e.g. using ion exchange apparatus or by appropriate reaction with salts or acids, optionally in several steps, e.g. via the hydroxide or carbonate.

The starting materials may be obtained in conventional manner, e.g. the compounds of formula II may be obtained by reacting the diazo derivative of an amine of formula III,

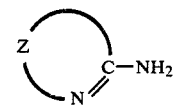

with a coupling component of formula IV,

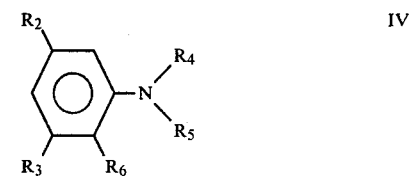

in which $R_2$ to $R_6$ are as defined above.

The reaction is conveniently carried out in conventional manner, e.g. in aqueous medium at a temperature of $-10°$ to $30°$ C., optionally in the presence of an organic solvent and in the presence of a coupling accelerator such as pyridine, urea or guanidine.

The compounds of formulae III and IV are known or may be obtained in conventional manner from available starting materials.

The compounds of the invention are useful for the dyeing or printing of basic dyeable substrates e.g. comprising or consisting of homo- or mixed-polymers of acrylonitrile or of asymmetrical dicyanoethylene, or of synthetic polyamide or polyester modified by the introduction of acid groups, leather and paper. The polymeric material may, for example, be in fibre, filament, woven or non-woven form.

The compounds of the invention may be employed in conventional manner and in conventional amounts for the dyeing of the above substrates, textile substrates conveniently being dyed in neutral or acidic aqueous medium at a temperature of from $60°$ C. to the boiling point, or to temperatures above $100°$ C. under pressure.

The compounds may be converted into dyeing preparations as desired, e.g. processed into stable liquid or solid preparations in conventional manner, e.g. by milling, granulating or dissolving in solvents, optionally with the aid of, for example, a stabiliser or solubiliser such as urea. Examples of suitable preparations are disclosed in French Pat. Nos. 1,572,030 and 1,581,900.

The dyeings obtained on polyacrylonitrile and on acid modified polyamide or polyester, particularly the latter, have good light and wet fastness and good fastness to steam, overheating and sublimation. The dyeing affinity of the compounds and the fastness to washing, perspiration, pleating, decatizing, ironing, water, sea water, dry cleaning, cross-dyeing and solvents are also satisfactory. The dyestuffs have good solubility in water and give fast, even dyeings. They are pH stable in the acid region when dyeing at high temperatures. They have the advantage of a low combination constant and are therefore particularly suitable in combinations for short-time dyeing processes. The compounds resist natural and unmodified polyamide.

The invention is illustrated by the following Examples, in which all parts and percentages are by weight and all temperatures in degrees centigrade.

EXAMPLE 1

18.5 Parts of the compound of the formula

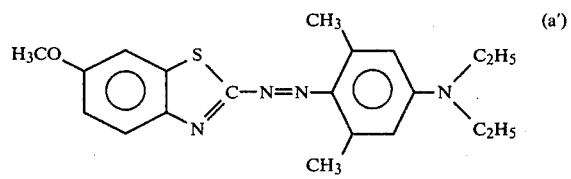

obtained by coupling diazotized 2-amino-6-methoxybenzothiazole with N,N-diethyl-3,5-dimethylaniline in an aqueous acidic medium at 0°–20°, are stirred into 200 parts of glacial acetic acid, and 2 parts of magnesium oxide are added. The mixture is heated to 60°–65°. Then, over the course of 30 minutes, 12.6 parts of dimethyl sulphate are added drop-wise such that the temperature remains constant. The mixture is stirred for 5 hours. Completion of quaternisation may be determined using thin-layer chromatography. The reaction mixture is stirred into 1000 parts of water and the dyestuff is precipitated by adding 70 parts of sodium chloride and 10 parts of zinc chloride. It is filtered off and washed with a 5% aqueous common salt solution. The dyestuff dyes polyacrylonitrile and anionically modified polyester in fast bluish-violet shades.

By stirring 18.5 parts of the compound of the above-mentioned formula (a) into 200 parts of glacial acetic acid and after heating the mixture to 40°–45° over the course of 2 hours, by adding 13.2 parts of ethylene oxide, then stirring it for 3 hours at the same temperature, discharging it onto 1000 parts of water and precipitating it in the same way as above with sodium chloride and zinc chloride, the dyestuff of Example 47 is obtained, which dyes anionically modified polyester in reddish-blue shades and polyacrylonitrile in violet shades with good wet and light fastness.

EXAMPLE 2

8.4 Parts of 3-amino-2-methyl-1,2,4-triazole are dissolved in 22 parts of 64% nitric acid and 18 parts of water. 20 Parts of ice are added and, over the course of 20 minutes, 20.8 parts of an aqueous 4 N sodium nitrite solution are dropwise added. After 30 minutes, the excess nitrite is broken down with 0.4 parts of aminosulfonic acid and the diazo solution is added drop-wise, over the course of 20 minutes, to a solution consisting of 17.7 parts of the coupling component of the formula

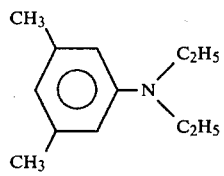

100 parts of glacial acetic acid, 50 parts of dimethyl formamide and 2 parts of aminosulfonic acid. The pH is brought to 4.0–4.5 by adding sodium hydroxide. The suspension is stirred for 20 hours and the precipitated dyestuff is filtered off.

20.4 Parts of the dried, ground dyestuff are dissolved at 50° in 110 parts of chloroform, and 4 parts of magnesium oxide are added. Over the course of 15 minutes, 16.5 parts of dimethyl sulphate are drop-wise added and the mixture is stirred for 3 hours at 50°–55°. After cooling to room temperature, the suspension is diluted with 150 parts of chloroform and is filtered over hyflo. After removing the solvent in a vacuum, the oily residue is entered into 300 parts of water and 90 parts of ethanol and is salted out using 12 parts of zinc chloride and 25 parts of sodium chloride. After stirring for 2 hours, the precipitated dyestuff is filtered off and dried in a vacuum at 50°.

The dyestuff of the formula

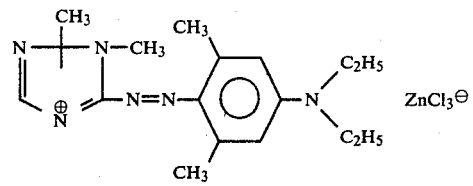

which dyes polyacrylonitrile and acidic modified polyester fibres in red shades is thus obtained.

DYEING PREPARATION A

20 Parts of the dyestuff described in Example 1 and 80 parts of dextrin are ground for 4 hours in a powder mill. The same dye mixture may also be obtained by forming a paste with 100 parts of water and subsequently spray-drying. 1 Part of the preparation thus obtained is made into a paste with 1 part of 40% glacial acetic acid. The paste is covered with 200 parts of demineralised water and is boiled up for a short time. It is then diluted with 7000 parts of demineralised water, 2 parts of glacial acetic acid are added and it is entered into a dyeing bath at 60° with 100 parts of polyacrylonitrile fabric. The material may be pretreated for 10–15 minutes at 60° in a bath consisting of 8000 parts of water and 2 parts of glacial acetic acid.

This is then heated over the course of 30 minutes to 98°–100°, boiled for 1½ hours and rinsed. A bluish-violet dyeing is obtained which has good light and wet fastness.

10 Parts of the dyestuff mentioned in Example 1 are dissolved in 60 parts of glacial acetic acid and 30 parts of water. A stable, concentrated solution of the dyestuff is obtained, which has a dyestuff content of about 10%, and which may be used in accordance with the above dyeing formula for dyeing polyacrylonitrile.

DYEING PREPARATION B

20 Parts of the dyestuff of Example 1 are mixed for 48 hours with 80 parts of dextrin in a ball mill; 1 part of the preparation thus obtained is made into a paste with 1 part of 40% glacial acetic acid, the paste is covered with 200 parts of demineralised water and is boiled up for a short time. Dyeing takes place as follows using this stock solution:

(a) It is diluted with 7000 parts of demineralised water, then 21 parts of calcined sodium sulphate, 14 parts of ammonium sulphate, 14 parts of formic acid and 15 parts of a carrier based on reaction products of ethylene oxide with dichlorophenols are added, and it is entered at 60° into a dyebath with 100 parts of acid modified polyester fabric. The material may be pretreated for 10-15 minutes at 60° in a bath consisting of 8000 parts of water and 2 parts of glacial acetic acid.

It is heated over the course of 30 minutes to 98°-100°, boiled for one hour and rinsed. An even, bluish-violet dyeing with good wet fastness is obtained.

(b) It is diluted with 3000 parts of demineralised water, then 18 parts of calcined sodium sulphate and 6 parts of ammonium sulphate and 6 parts of formic acid are added, and it is entered at 60° into a dyebath with 100 parts of polyester fabric which is modified by acid groups. It is heated in a closed vessel to 110° over the course of 45 minutes, maintained at this temperature for 1 hour with shaking, then cooled over the course of 25 minutes to 60° and the dye matter is rinsed. An even, bluish-violet dyeing having good wet fastness is obtained.

(c) The procedure is as for (b), but heating is for 1 hour at 120° in the closed vessel.

In the following Table I is given the structural composition of further dyestuffs. They may be produced as described in Example 1 and correspond to the formula

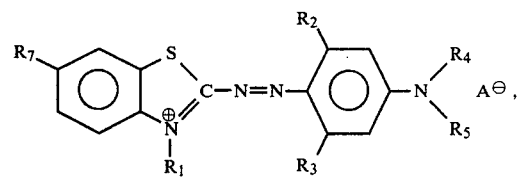

wherein $R_1$ to $R_5$ and $R_7$ have the significances given in the columns. In a further column X is given the shade of the dyeing on acid-modified polyester material. The anions $A^\ominus$ are $ZnCl_3^\ominus$ ions if precipitation of the dyestuff is carried out as described in Example 1. By employing appropriate alternative techniques, however, other anions, e.g. those hereinbefore listed, may be introduced.

TABLE I

| Example | $R_7$ | $R_1$ | $R_2$ | $R_3$ | $R_4$ | $R_5$ | X |
|---|---|---|---|---|---|---|---|
| 3 | H | $CH_3$ | $CH_3$ | $CH_3$ | $CH_3$ | $CH_3$ | reddish-blue |
| 4 | H | $C_2H_5$ | " | " | " | " | reddish-blue |
| 5 | H | $C_2H_4OH$ | " | " | " | " | reddish-blue |
| 6 | H | $C_2H_4-CONH_2$ | " | " | " | " | reddish-blue |
| 7 | H | $CH_3$ | " | " | $C_2H_4OH$ | $C_2H_5$ | blue |
| 8 | H | " | " | " | $C_2H_4-CONH_2$ | " | " |
| 9 | H | " | " | " | $C_2H_4CN$ | " | reddish blue |
| 10 | H | " | " | " | $C_2H_5$ | " | reddish-blue |
| 11 | H | " | " | " | $C_3H_7$ | $C_3H_7$ | reddish-blue |
| 12 | H | " | " | " | $CH_2-C_6H_5$ | $C_2H_5$ | reddish-blue |
| 13 | $CH_3$ | " | " | " | $CH_3$ | $CH_3$ | reddish-blue |
| 14 | " | " | " | " | $C_2H_5$ | $C_2H_5$ | reddish-blue |
| 15 | " | " | " | " | $C_3H_7$ | $C_3H_7$ | reddish-blue |
| 16 | " | " | " | " | $C_4H_9$ | $C_4H_9$ | reddish-blue |
| 17 | " | " | " | " | $C_2H_4OH$ | $C_2H_5$ | blue |
| 18 | " | " | " | " | $C_2H_4CN$ | " | " |
| 19 | " | " | " | " | $C_2H_4-CONH_2$ | " | " |
| 20 | " | " | " | " | $CH_2-C_6H_5$ | " | reddish-blue |
| 21 | " | $C_2H_5$ | " | " | $C_2H_5$ | $C_2H_5$ | reddish-blue |
| 22 | " | $C_2H_4OH$ | " | " | " | " | reddish-blue |
| 23 | " | $C_2H_4-CONH_2$ | " | " | " | " | reddish-blue |
| 23 | " | " | " | " | " | " | reddish-blue |
| 24 | " | $CH_2-CHOH-CH_3$ | " | " | " | " | reddish-blue |
| 25 | $OCH_3$ | $CH_3$ | " | " | $CH_3$ | $CH_3$ | reddish-blue |
| 26 | " | " | " | " | $C_3H_7$ | $C_3H_7$ | reddish-blue |
| 27 | " | " | " | " | $C_4H_9$ | $C_4H_9$ | reddish-blue |
| 28 | " | " | " | " | $CH_2-CH(CH_3)_2$ | $CH_2-CH(CH_3)_2$ | reddish-blue |
| 29 | " | " | " | " | $C_2H_4OH$ | $CH_3$ | blue |
| 30 | " | " | " | " | " | $C_2H_5$ | " |
| 31 | " | " | " | " | " | $C_2H_4OH$ | " |
| 32 | " | " | " | " | $C_2H_4Cl$ | $C_2H_5$ | " |
| 33 | " | " | " | " | $C_2H_4-CONH_2$ | " | " |

TABLE I-continued

| Example | R₇ | R₁ | R₂ | R₃ | R₄ | R₅ | X |
|---|---|---|---|---|---|---|---|
| 34 | " | " | " | " | " | CH₃ | " |
| 35 | " | " | " | " | C₂H₄I₃ CN | C₂H₅ | " |
| 36 | " | " | " | " | C₂H₄—O—C₆H₅ | " | " |
| 37 | " | " | " | " | CH₂—C₆H₅ | CH₃ | reddish-blue |
| 38 | " | " | " | " | " | C₂H₅ | reddish-blue |
| 39 | " | " | " | " | C₆H₅ | CH₃ | blue |
| 40 | " | " | " | " | " | C₂H₅ | " |
| 41 | " | " | C₂H₅ | C₂H₅ | C₂H₅ | " | reddish-blue |
| 42 | " | " | " | " | C₂H₄OH | " | blue |
| 43 | " | " | " | " | CH₃ | CH₃ | reddish-blue |
| 44 | " | C₂H₅ | CH₃ | CH₃ | " | " | reddish-blue |
| 45 | " | " | " | " | C₂H₅ | C₂H₅ | reddish-blue |
| 46 | " | " | " | " | C₂H₄OH | " | reddish-blue |
| 47 | " | C₂H₄OH | " | " | C₂H₅ | " | reddish-blue |
| 48 | " | " | " | " | C₂H₄OH | " | blue |
| 49 | " | C₂H₄CONH₂ | " | " | C₂H₅ | " | reddish-blue |
| 50 | " | " | " | " | C₂H₄OH | " | blue |
| 51 | " | CH₂—CHOH—CH₃ | " | " | C₂H₅ | " | reddish-blue |
| 52 | OC₂H₅ | CH₃ | " | " | CH₃ | CH₃ | reddish-blue |
| 53 | " | " | " | " | C₂H₅ | C₂H₅ | reddish-blue |
| 54 | " | " | " | " | C₂H₄OH | " | blue |
| 55 | " | " | " | " | C₂H₄—O—C₆H₅ | " | " |
| 56 | " | " | " | " | C₂H₄—CONH₂ | CH₃ | " |
| 57 | " | " | " | " | C₃H₇ | C₃H₇ | reddish-blue |
| 58 | " | " | " | " | C₄H₉ | C₄H₉ | reddish-blue |
| 59 | " | " | " | " | CH₂—C₆H₅ | C₂H₅ | reddish-blue |
| 60 | " | " | " | " | C₆H₅ | CH₃ | blue |
| 61 | OCH₃ | " | C₂H₅ | C₂H₅ | C₂H₅ | C₂H₅ | reddish-blue |
| 62 | OC₂H₅ | C₂H₅ | CH₃ | CH₃ | " | " | reddish-blue |
| 63 | " | C₂H₄OH | " | " | C₂H₅ | C₂H₅ | reddish-blue |
| 64 | " | C₂H₄—CONH₂ | " | " | " | " | reddish-blue |
| 65 | " | CH₂—CHOH—CH₃ | " | " | " | " | reddish-blue |
| 66 | OC₆H₅ | CH₃ | " | " | CH₃ | CH₃ | reddish-blue |
| 67 | " | " | " | " | C₂H₅ | C₂H₅ | reddish-blue |
| 68 | NH—COCH₃ | " | " | " | " | " | reddish-blue |
| 69 | OCH₃ | " | " | " | R₄ together with R₅ —CH₂—CH₂—O—CH₂—CH₂— | | blue |
| 70 | Cl | " | " | " | C₂H₅ | C₂H₅ | reddish-blue |
| 71 | COO—CH₃ | " | " | " | " | " | blue |
| 72 | SO₂—CH₃ | " | " | " | " | " | " |

In the following Table II is given the structural composition of further dyestuffs. They may be produced as described in Example 1 and correspond to the formula

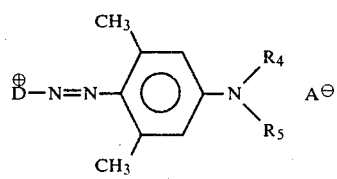

wherein D⊕, R₄ and R₅ have the significance given in the columns. In a further column X is given the shade of the dyeing on acid-modified polyester material. The anions A⊖ may, again, be those listed in the description but are ZnCl₃⊖ if the dyestuffs are precipitated as described in Example 1. As will be appreciated, the compounds in the following table are representative of the compounds of formula I which have other than benzothiazoles as the radicals derived from the diazo component. Analogous compounds to those in the following Table II, but in which R₁ to R₇ are as listed in Table I, may be produced in appropriate manner.

TABLE II

| Example | D⊕ | $R_4$ | $R_5$ | X |
|---|---|---|---|---|
| 73 | naphtho-thiazolium with N-CH₃ | $CH_3$ | $CH_3$ | reddish-blue |
| 74 | " | $C_2H_5$ | $C_2H_5$ | reddish-blue |
| 75 | thiazolium with N-CH₃ | " | " | blue-violet |
| 76 | 5-nitro-1-methyl-indazolium with N⊕-CH₃ | " | " | red-violet |
| 77 | 1-methyl-indazolium with N⊕-CH₃ | " | " | bluish-red |
| 78 | thiazolium with N-CH₃ | $CH_3$ | phenyl | bluish-violet |
| 79 | 4,4-dimethyl-1-methyl-imidazolinium | $C_2H_5$ | $C_2H_5$ | red |
| 80 | 4-methyl-4-phenyl-1-methyl-imidazolinium | " | " | bluish-red |
| 81 | 4-benzyl-4-methyl-1-methyl-imidazolinium | " | " | red |

TABLE II-continued

| Example | D⊕ | R$_4$ | R$_5$ | X |
|---|---|---|---|---|
| 82 | (N-methyl-2-methylpyridinium) | " | " | bluish-red |
| 83 | (1,3-dimethyl-imidazolium-2-yl) | " | " | red |

What is claimed is:

1. A compound of the formula

[structure with R$_9$-C, R$_{10}$-C, S, N⊕-R$_1'$, C-N=N-phenyl ring with R$_2'$, R$_3'$, R$_6'$, and N(R$_4'$)(R$_5'$), A$^\ominus$]

wherein R$_1'$ is n-C$_{1-6}$alkyl; n-C$_{1-6}$alkyl monosubstituted by halo, hydroxy, cyano, C$_{1-4}$alkoxy or carbamoyl or disubstituted by halo and hydroxy or halo and cyano; or allyl, each of R$_2'$ and R$_3'$ is independently C$_{1-4}$alkyl, R$_4'$ is hydrogen; C$_{1-4}$alkyl; C$_{1-4}$alkyl monosubstituted by halo, hydroxy, cyano, phenyl, benzoyloxy, (C$_{1-4}$alkoxy)carbonyl, phenylcarbamoyl, phenoxy, di-(C$_{1-4}$alkyl)carbamoyl, carbamoyl, phenylcarbamoyloxy, di-(C$_{1-4}$alkyl)carbamoyloxy or C$_{1-4}$alkoxy or disubstituted by halo; phenyl; p-(C$_{1-4}$alkoxy)phenyl or cyclohexyl, R$_5'$ is hydrogen, C$_{1-4}$alkyl or C$_{1-4}$alkyl monosubstituted by halo, hydroxy, cyano, phenyl, benzoyloxy, (C$_{1-4}$alkoxy)carbonyl, di-(C$_{1-4}$-alkyl)carbamoyl, carbamoyl, phenoxy, phenylcarbamoyl or C$_{1-4}$alkoxy or disubstituted by halo or R$_4'$ and R$_5'$ taken together and with the nitrogen atom to which they are joined are morpholino, R$_6'$ is methyl when R$_4'$ and R$_5'$ are hydrogen and is otherwise hydrogen, R$_9$ is hydrogen, C$_{1-4}$alkyl or phenyl, R$_{10}$ is hydrogen, C$_{1-4}$alkyl or phenyl, with the proviso that when one of R$_9$ and R$_{10}$ is phenyl, the other is hydrogen, and A$^\ominus$ is an anion.

2. A compound according to claim 1 wherein A$^\ominus$ is chloride, bromide, iodide, sulfate, bisulfate, methylsulfate, aminosulfate, perchlorate, carbonate, bicarbonate, phosphate, phosphorus molybdate, phosphorus tungstate, phosphorus tungsten molybdate, benzenesulfonate, naphthalenesulfonate, 2-chlorobenzenesulfonate, oxalate, maleinate, acetate, propionate, lactate, succinate, chloroacetate, tartrate, malate, methanesulfonate, benzoate or ZnCl$_3^\ominus$.

3. A compound according to claim 1 wherein R$_1'$ is methyl or ethyl,
R$_2'$ is methyl or ethyl,
R$_3'$ is methyl or ethyl,
R$_4'$ is C$_{1-4}$alkyl, phenyl or benzyl,
R$_5'$ is C$_{1-4}$alkyl,
R$_6'$ is hydrogen,
R$_9$ is hydrogen, and
R$_{10}$ is hydrogen.

4. A compound according to claim 3 having the formula

[structure with thiazolium ring N⊕-CH$_3$, S, C-N=N-phenyl(CH$_3$, CH$_3$)-N(C$_2$H$_5$)$_2$, A$^\ominus$]

wherein A$^\ominus$ is an anion.

5. The compound according to claim 4 wherein A$^\ominus$ is ZnCl$_3^\ominus$.

6. A compound according to claim 3 having the formula

[structure with thiazolium ring N⊕-CH$_3$, S, C-N=N-phenyl(CH$_3$, CH$_3$)-N(CH$_3$)(phenyl), A$^\ominus$]

wherein A$^\ominus$ is an anion.

7. The compound according to claim 6 wherein A$^\ominus$ is ZnCl$_3^\ominus$.

* * * * *